(12) United States Patent
Han et al.

(10) Patent No.: US 9,109,063 B2
(45) Date of Patent: *Aug. 18, 2015

(54) ACRYLAMIDE-BASED MESOPOROUS POLYMER AND PREPARATION METHOD THEREOF

(75) Inventors: Yang-Kyoo Han, Seoul (KR); Je-Gwon Lee, Seoul (KR); Ji-soo Jeong, Seongnam-si (KR); Dae-Won Sohn, Seongnam-si (KR); Sung-Hwan Han, Seoul (KR); Hyun-Hoon Song, Daejeon (KR); Kwan-Mook Kim, Seoul (KR)

(73) Assignees: LG Chem, Ltd., Seoul (KR); IUCF-HYU (Industry-University Cooperation Foundation Hanyang University, Seoul (KR)

(*) Notice: Subject to any disclaimer, the term of this patent is extended or adjusted under 35 U.S.C. 154(b) by 20 days.

This patent is subject to a terminal disclaimer.

(21) Appl. No.: 13/879,999

(22) PCT Filed: Aug. 26, 2011

(86) PCT No.: PCT/KR2011/006335
§ 371 (c)(1),
(2), (4) Date: Apr. 17, 2013

(87) PCT Pub. No.: WO2012/057443
PCT Pub. Date: May 3, 2012

(65) Prior Publication Data
US 2013/0245145 A1    Sep. 19, 2013

(30) Foreign Application Priority Data
Oct. 29, 2010  (KR) ................. 10-2010-0107067

(51) Int. Cl.
*C08F 20/70* (2006.01)
*C08J 9/00* (2006.01)
(Continued)

(52) U.S. Cl.
CPC .............. *C08F 20/70* (2013.01); *B01J 20/261* (2013.01); *B01J 20/28083* (2013.01); *C08F 2/38* (2013.01);
(Continued)

(58) Field of Classification Search
CPC ....... C08F 20/56; C08F 220/56; C08F 120/56
See application file for complete search history.

(56) References Cited

U.S. PATENT DOCUMENTS
2001/0020050 A1    9/2001   Jansen

FOREIGN PATENT DOCUMENTS
CN    101693749 A    4/2010
CN    101717479 A1   6/2010
(Continued)

OTHER PUBLICATIONS

Jung, J. S. et al. "Synthesis and Characterization of New Crystalline Poly(DPAA)" abstract for the annual meeting of the polymer society of Korea, 2007, vol. 32.*
(Continued)

*Primary Examiner* — Randy Gulakowski
*Assistant Examiner* — Christina Wales
(74) *Attorney, Agent, or Firm* — Dentons US LLP

(57) ABSTRACT

The present invention relates to an acrylamide-based mesoporous polymer and its preparation method, where the acrylamide-based mesoporous polymer is fabricated by a simple preparation method to have uniform minute pores controllable in pore size and thereby applicable to a wide variety of fields.

The acrylamide-based mesoporous polymer includes at least one of a defined repeating unit and contains a plurality of pores having a diameter of 2.0 to 10.0 nm in the solid state.

7 Claims, 6 Drawing Sheets

(51) Int. Cl.
  C08F 2/38     (2006.01)
  C08F 4/04     (2006.01)
  C08J 9/28     (2006.01)
  C08F 120/54   (2006.01)
  C08F 220/54   (2006.01)
  B01J 20/26    (2006.01)
  B01J 20/28    (2006.01)

(52) U.S. Cl.
  CPC ............... *C08F 4/04* (2013.01); *C08F 120/54* (2013.01); *C08F 220/54* (2013.01); *C08J 9/0023* (2013.01); *C08J 9/28* (2013.01); *C08F 2438/03* (2013.01); *C08J 2333/24* (2013.01)

(56) References Cited

FOREIGN PATENT DOCUMENTS

| KR | 10-0464846 | | 1/2005 |
| KR | 20050056288 | * | 6/2005 |
| KR | 1020050056288 | A | 6/2005 |
| KR | 10-0541748 | | 1/2006 |
| WO | WO 01/78886 | | 10/2001 |
| WO | WO 2006/110740 | | 10/2006 |
| WO | WO 2009/010945 | | 1/2009 |
| WO | WO 2009/011545 | | 1/2009 |

OTHER PUBLICATIONS

Jung, et al. "Synthesis and Characterization of New Crystalline Poly(DPAA)" In abstract for the annual meeting of the polymer society of Korea, 2007, vol. 32.

Lee, et al. "Synthesis and Characterization of New Block Copolymers with PDPAA Hard Block and Poly (n-butyl acrylate) Soft Block Using Raft Polymerization", In abstract for the annual meeting of the polymer society of Korea, 2007, vol. 32.

Kim, eal. "Synthesis of New Thermo-Responsive Poly(acrylamides) and Their Sol-Gel Phase Transition Behaviors in Aromatic Solvents". Polymer Preprints, 2005, vol. 46, p. 1061.

Kim, et al. "Structure of DPAA/Styrene Gel in Free Radical Polymerization" Polymer Preprints, 2001, vol. 42, p. 310.

"An Ordered Mesoporous Organsilica Hybrid Material with a Crystal-Like Wall Structure" Inagaki, et al..; Macmillan Magazines, Ltd.; vol. 416; Mar. 2002.

"Superior Lithium Electroactive Mesoporous Si@ Carbon Core-Shell Nanowires for Lithium Battery Anode Material"; Department of Applied Chemistry, Hanyang University , Ansan, 426,791; Nano Letters; vol. 8, No. 11; 3688-3691; 2008.

Past and Present, and Future of Periodic Mesoporous Organosilicas—The PMOs; Hatton, et al. ; ACC Chem, Res. 2005, 38, 305-312.

Three-Dimensional Low Symmetry Mesoporous Silica Structures Templated for Tetra-Headgroup Rigid Bolaform Quaternary Ammonium Surfactant; Shen, et al.; J. Am. Chem, Soc. 3005; 127, 6780-6787, published 2005.

Self Assembly of Nanoscale Cuboctahedra by Coordination Chemistry; Olenyuk, et al. ; 1999 Macmillan Magazines, Ltd; Nature; vol. 398; Apr. 29, 1999.

"High-Symmetry Coordination Cages via Self-Assembly" Seidel; et al.; ACC. Chem. Res. 2002, 35-972-983.

"Simultaneous Encapsulation: Molecules Held at Close Range" Rebek; Angew. Chem. Int. Ed. 2005; 44; 2068-2078.

"Polymer Hollow Particles with Controllable Holes in Their Surfaces" Im, et al. ; Nature Publishing Group vol. 4; Sep. 2005.

"Gold Particles as Templates for the Synthesis of Hollow Polymer Capsules . . . "; Marinakos, et al.; 1999 American Chemical Society; Aug. 31, 1999.

"Evolution of Block Copolymer Lithography to Highly Ordered Square Arrays" Tang, et al.; Science vol. 322; Oct. 17, 2008.

"Unifying Weak-and Strong-Segregation Block Copolymer Theories" ; Matsen, et al.; Macromolecules; vol. 29, No. 4; Feb. 12, 1996.

"Multiple Nanoscale Templates by Orthogonal Degradation of a Supramolecular Block Copolymer Lithographic System" Tang, et al.; 2010 American Chemical Society; vol. 4; No. 1; 285-291.

"Templated Self-Assembly of Square Symmetry Arrays from an ABC Triblock Terpolymer" Chuang, et al.; 2009 American Chemical Society; Nov. 11, 2009.

"A Novel Route to Three-Dimensionally Ordered Macroporous Polymers by Electron Irradiation of Polymer Colloids" Adv. Mater; 2005; vol. 17; No. 1; Jan. 6.

"Ordered Nanoporous Arrays of Carbon Supporting High Dispersions of Platinum Nanoparticles" Joo, et al.; 2001 Macmillan Magazines Ltd.; Nature; vol. 412; Jul. 12, 2001.

"Dynamic Instability in a DNA-Segregating Prokaryotic Actin Homolog"; Garner, et al.; Science 306, 1021; 2004.

* cited by examiner

ACRYLAMIDE-BASED MESOPOROUS POLYMER AND PREPARATION METHOD THEREOF

This application is a National Stage Entry of International Application No. PCT/KR 2011/006335, filed Aug. 26, 2011, and claims the benefit of Korean Application No. 10-2010-0107067 filed on Oct. 29, 2010, all of which are hereby incorporated by reference in their entirety for all purposes as if fully set forth herein.

TECHNICAL FIELD

The present invention relates to a novel acrylamide-based mesoporous polymer and a preparation method thereof, and more particularly, to an acrylamide-based mesoporous polymer and a preparation method thereof that provides an acrylamide-based mesoporous polymer prepared by a simple method to have uniform minute pores controllable in pore size and thereby applied to a wide variety of fields.

BACKGROUND ART

Recently, many porous materials have been used in many applications for the purpose of various catalysts or of adsorbing or capturing specific volatile organic compounds or gaseous molecules. For this reason, a considerable interest has been concentrated on the technologies concerning various porous materials and their preparation methods.

Such porous materials fall into three classes, inorganic material, organic material and polymer material, depending on the chemical structure and composition of the components. According to the IUPAC (International Union of Pure and Applied Chemistry), those materials are sub-classified based on the size of pores that are introduced in the material: microporous material (pore diameter<2.0 nm), mesoporous material (2.0<pore diameter<50 nm) and macroporous material (pore diameter>50 nm).

Among the porous materials, typical examples of the microporous material are zeolite and carbon nanotube that contain naturally formed minute pores in pore size 2.0 nm or less. Many studies have been made on other porous materials than these natural porous materials and their preparation methods. There are six up-to-date known methods for preparing porous materials.

The first one is a synthesis of mesoporous silica or organic-inorganic hybrid materials using an organic surfactant as a template. The pore size of the product is dependent on the type, chemical structure or reaction conditions of the surfactant (see *Nature* 2002, 416, 304; Nature 2001, 412, 169; *Nano letters* 2008, 8(11), 3688; *Acc. Chem. Res.* 2005, 38, 305; *J. Am. Chem. Soc.* 2005, 127, 6780; WO09/010,945; US Pat. Application No. 20100015026; or WO01/78886).

The second method uses minute metal-organic building blocks of a constant size that are formed by electrostatic attractions between metal cations and organic ligands. These metal-organic building blocks self-assemble into microporous or mesoporous metal-organic frameworks (MOFs) that come in various crystal shapes, including tetrahedral, pentahedral, hexagonal, octagonal, simple cubic, or face-centered cubic (see *Nature* 1999, 398, 796; *Science* 2004, 306 1021; *Acc. Chem. Res.* 2002, 35, 972; WO09/011, 545; WO06/110740).

The third one involves an organic synthesis method to produce host molecules having a specific pore size, such as crown ether, cryptand and calixarene derivatives, or cyclodextrin. The synthesized host molecules bind to guest molecules fitting into the host cavity to have a function of separating a specific substance (see *Angew. Chem. Int'l. Ed.* 2005, 44, 2068).

In the fourth method, small organic molecules (so-called porogens) including pentane or toluene are added to cause polymerization or supramolecule synthesis reaction and then removed from the resultant cross-linked polymer or supramolecule to prepare a porous material. The size of pores introduced is dependent on the chemical structure and concentration of the porogens (see *Nature Materials* 2005, 4, 671; *J. Am. Chem. Soc.* 1999, 121, 8518).

The fifth method uses microphase separation of block copolymers to prepare polymer nanostructures that have porous morphology, including sphere, lamellae, hexagonally packed cylinder, or zyroid (see *Science* 2008, 322, 429; *Macromolecules* 1996, 29, 1091; *ACS NANO* 2010, 4, 285; *NANO Lett.* 2009, 9, 4364).

In the sixth method, a polymer colloid of a constant size is three-dimensionally arranged to form polymer colloid crystals and then exposed to an electron beam to obtain a three-dimensionally arranged macroporous polymer structure (see *Adv. Mater.* 2005, 17(1), 120-125).

The above-described six methods are however impractical for the preparation of porous materials in an industrial scale because most of them require strictly controlled reaction conditions or involve complicated reaction mechanisms. Furthermore, the porous materials prepared by the respective methods are hard to control in pore size and thus limited in their applicable usage.

DISCLOSURE

Technical Problem

Accordingly, the present invention provides an acrylamide-based mesoporous polymer that is fabricated by a simple preparation method to have uniform minute pores controllable in pore size and thereby applicable to a wide variety of fields.

Further, the present invention provides a method for preparing an acrylamide-based mesoporous polymer in a simple manner.

Technical Solution

The present invention provides an acrylamide-based mesoporous polymer comprising at least one repeating unit of the following formula 1, and including a plurality of pores having a diameter of about 2.0 to 10.0 nm in solid state:

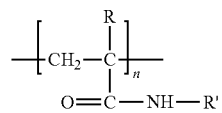

[Formula 1]

wherein n is an integer from 15 to 1800; R is hydrogen or methyl; and R' is X,

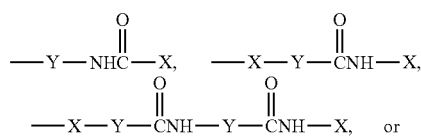

-continued

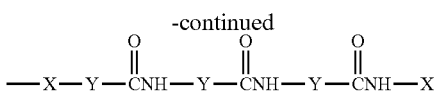

wherein X is —Z—R"; Y is alkylene having 1 to 10 carbon atoms; Z is arylene having 6 to 20 carbon atoms; and R" is a linear or branched hydrocarbon having 10 to 20 carbon atoms, or a linear or branched perfluorohydrocarbon having 10 to 20 carbon atoms.

The present invention also provides a preparation method for an acrylamide-based mesoporous polymer comprising: carrying out RAFT (Reversible Addition-Fragmentation Chain Transfer) polymerization of a reactant including at least one monomer of the following formula 2 in the presence of a radical initiator and a RAFT agent; and precipitating a product of the polymerization reaction in a nonsolvent,

[Formula 2]

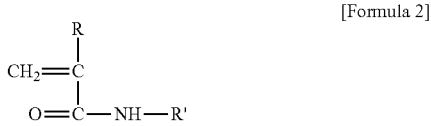

wherein R and R' are as defined above in formula 1.

Hereinafter, the acrylamide-based mesoporous polymer and its preparation method according to the preferred embodiments of the invention will be described in detail as follows.

According to one embodiment of the invention, an acrylamide-based mesoporous polymer comprising at least one repeating unit of the following formula 1, and including a plurality of pores having a diameter of about 2.0 to 10.0 nm in solid state is provided:

[Formula 1]

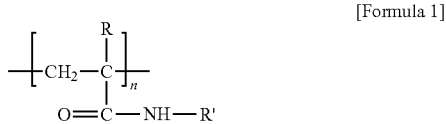

wherein n is an integer from 15 to 1800; R is hydrogen or methyl; and R' is X,

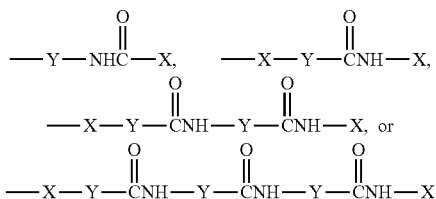

wherein X is —Z—R"; Y is alkylene having 1 to 10 carbon atoms; Z is arylene having 6 to 20 carbon atoms; and R" is a linear or branched hydrocarbon having 10 to 20 carbon atoms, or a linear or branched perfluorohydrocarbon having 10 to 20 carbon atoms.

The inventors of the present invention found out that a mesoporous polymer having a plurality of pores of a defined diameter can be prepared by polymerizing a defined acrylamide-based monomer (hereinafter, understood as the monomer of the following formula 2) through RAFT polymerization known as "leaving radical polymerization", and derived the present invention.

In particular, such a polymer can be endowed with a plurality of pores in the solid state without a separate treatment other than polymerization carried out for its preparation. As will be described below in further detail, the size of pores formed on the polymer can be easily controlled by annealing the polymer at a predetermined temperature; changing the chemical structure of R' bonded to the amide (—CO—NH—) group; or adjusting the length (e.g., the number of carbon atoms of the hydrocarbon chain corresponding to R") of the aliphatic hydrocarbon bonded to the end of R'.

Accordingly, the polymer not only can be prepared to have uniform minute pores in a simple method but also can be easily controlled in pore size. For that reason, the polymer is preferably applicable in a wide variety of fields or uses that are in need of mesoporous materials for the purpose of, for example, selectively adsorbing or capturing various catalysts, volatile organic compounds, gaseous molecules, or specific organic materials or proteins.

The reason that the polymer has a large number of uniform minute pores in the solid state presumably lies in the characteristic structure of the monomer used as a reactant or the specific preparation method using the monomer. This will be described in further detail as follows.

The acrylamide-based monomer has a chemical structure that contains a self-assembling non-polar aliphatic hydrocarbon (having more than 10 carbon atoms), an arylene group causing π-π orbital interactions and an amide group causing intermolecular or intramolecular hydrogen bonding. Through the self-assembling behavior of the long-chain aliphatic hydrocarbon, π-π orbital interactions of the arylene groups and intramolecular hydrogen bonding of the amide groups, the monomer can form a regular monoclinic crystal structure, preferably monoclinic single crystals in the solid state. As a reference, FIG. 1 shows an example of the three-dimensional structure of the monomer that supports this monoclinic crystal structure.

As a RAFT polymerization is carried out on the monomer, a leaving radical polymerization occurs with the monomer molecules well-oriented, and thereby the individual monomer molecules are regularly arranged in the polymer chain. More specifically, the monomer molecules well-oriented through the polymerization combine together to form a polymer chain (i.e., one polymer building block), and these polymer building blocks aggregate to form a regularly arranged polymer. Due to the regular arrangement of the polymer building blocks in the polymer, the acrylamide-based mesoporous polymer according to one embodiment of the invention can include a large number of mesopores having a uniform pore size without a separate treatment after the polymerization reaction. For the same reason, the acrylamide-based mesoporous polymer can exhibit crystallinity. These features of the acrylamide-based polymer, such as crystallinity and mesoporosity are demonstrated according to the analysis on the thermal properties and the solid structure of the polymer using DSC (Differential Scanning calorimetry) and SAXS (Small Angle X-ray Scattering).

In the polymer according to one embodiment of the invention, Z is any arylene having 6 to 20 carbon atoms that includes:

o-phenylene

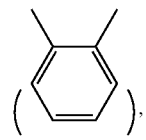

m-phenylene

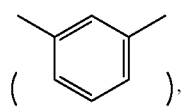

p-phenylene

naphthalene

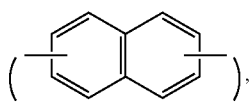

azobenzene

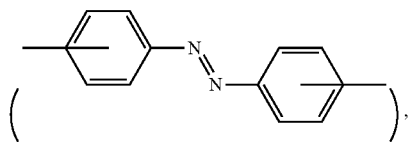

anthracene

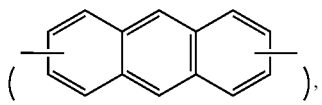

phenanthrene

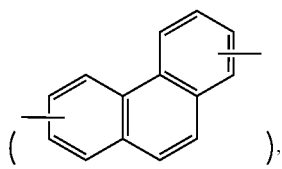

tetracene

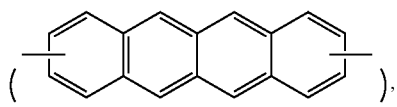

pyrene

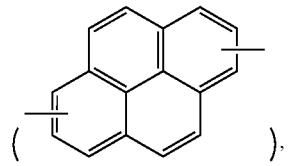

or benzopyrene

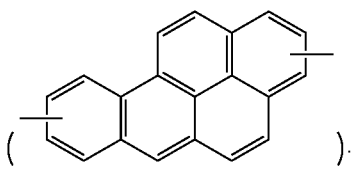

R" is a linear or branched hydrocarbon substituted at the ortho-, meta- or para-position of the aromatic ring in Z, and the hydrocarbon has a long chain containing at least 10 carbon atoms, more specifically, 10 to 20 carbon atoms. Also, the hydrocarbon of R" may be substituted with Fluorine and be a linear or branched perfluorohydrocarbon having 10 to 20 carbon atoms.

The repeating unit of the above formula 1 and the monomer of the formula 2 given below have such a long-chain hydrocarbon and arylene, so the polymer more prominently exhibits such features as mesoporosity and crystallinity.

The polymer according to one embodiment of the invention may be a homopolymer consisting of one repeating unit of formula 1, or a copolymer comprising at least two repeating units of formula 1.

The acrylamide-based mesoporous polymer includes a large number of pores having a diameter of about 2.0 to 10.0 nm, preferably about 2.0 to 6.0 nm, in the solid state. The term "diameter" of the pore as used herein is defined as the length of the longest straight line between two points on the circle, oval or polygon that is the cross-section in each pore. The polymer includes a large number of uniform pores in such a diameter range, and hence can be preferably applicable to various uses that need mesoporous materials.

The polymer has a number-average molecular weight of about 5000 to 500000, preferably about 7000 to 300000. The polymer is a crystalline polymer having a melting point ($T_m$) of about 200 to 300° C., preferably about 220 to 280° C. Due to the melting point and the molecular weight in the ranges, the polymer can be excellent in thermal stability pertaining to high melting point and high molecular weight, easily produced in the fiber form simply by spinning or the like, and also maintaining its excellent mechanical properties such as strength.

From the structural analysis on the solid polymer using SAXS (Small Angle X-ray Scattering) and WAXS (Wide Angle X-ray Scattering), and the thermal analysis on the phase-transition temperature of the polymer by DSC (Differential Scanning calorimetry), the inventors of the present invention found out that the polymer according to one embodiment of the invention might be a crystalline, mesoporous polymer having a melting point in the above-mentioned range. Unlike the conventional polymers of up-to-date known similar structures, the polymer of the invention has mesoporosity and crystallinity and can be preferably used in those applications that need mesoporous materials.

The inventors of the present invention also found out that the pore diameter on the polymer decreased with an increase in the annealing temperature during an annealing which was carried out on the polymer in the temperature range of at least about 200° C. and below the melting temperature, for example, between about 220° C. and 240° C. As the annealing temperature increased, the pore diameter decreased by about 0.4 to 0.7 nm, more specifically, by about 0.5 to 0.6 nm.

It was also revealed that the pore diameter on the polymer increased with a change in the chemical structure of R' bonded to the amide (—CO—NH—) group in the repeating unit of formula 1, or with an increase in the length of the aliphatic hydrocarbon bonded to the end of R', i.e., an increase in the number of carbon atoms of R". For example, the pore diameter increased by about 0.1 to 1.0 nm, more specifically, by about 0.2 to 0.7 nm as the number of carbon atoms increased from 12 to 16. The pore diameter also increased as the chemical structure of Z in R' changed from phenylene into another different aromatic structure such as naphthalene or anthracene.

The reason of the change in the pore diameter presumably lies in that the mesoporous three-dimensional structure (or, crystal structure) of the polymer changes by annealing process, by the changed chemical structure of R' bonded to the amide group, or by a change in the number of carbon atoms of R" bonded to the end of R'. This can be supported by the results of the DSC thermal analysis according to the examples that will be described later.

As described above, the polymer according to one embodiment of the invention is controllable in the pore size easily by carrying out an annealing, changing the chemical structure introduced in the amide group of the repeating unit, or controlling the length of the hydrocarbon, and thereby preferably adoptable in a wider variety of applications that require mesoporous materials.

According to another embodiment of the invention, a preparation method for an acrylamide-based mesoporous polymer comprising: carrying out RAFT (Reversible Addition-Fragmentation Chain Transfer) polymerization of a reactant including at least one monomer of formula 2 in the presence of a radical initiator and a RAFT agent; and precipitating the polymerization product in a nonsolvent is provided,

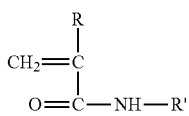

[Formula 2]

wherein R and R' are as defined above.

The acrylamide-based monomer having a specified chemical structure of formula 2 is subjected to RAFT polymerization under specified conditions and then to precipitation in a nonsolvent to easily form the acrylamide-based mesoporous polymer having mesoporosity and crystallinity. The reason that the polymer prepared by this method has mesoporosity and crystallinity is already described enough and will not be mentioned hereinafter in any further detail.

It is therefore possible to prepare a mesoporous polymer having a large number of pores in a uniform pore size merely by a polymerization process alone without any other separate chemical treatment. The preparation method thus provides a means for large-scaled industrial production of the mesoporous polymer applicable to many uses in various fields, so it can also be preferably applied for industrial and practical uses.

The preparation method may further comprise, prior to the polymerization step, (a) preparing a reaction solution including the radical initiator, the RAFT agent, and the reactant; (b) adding the reaction solution in a polymerization ampoule and eliminating oxygen by a freeze-thaw method; and (c) sealing the ampoule. In this manner that the individual reactants and the initiator are added in the oxygen-free polymerization ampoule and then subjected to polymerization, the RAFT polymerization well-known as a kind of leaving radical polymerization takes place more adequately to form the acrylamide-based mesoporous polymer with a high polymerization conversion.

The preparation method may further comprise, after the precipitation step, (a) dissolving the precipitated polymer product in an organic solvent; and (b) re-precipitating the polymer product solution with a nonsolvent. The addition of the re-precipitation step helps the preparation of the acrylamide-based mesoporous polymer having crystallinity in a more preferable way.

In the preparation method, the monomer is any acrylamide-based monomer of formula 2 and may include, for example, N-(p-dodecyl)phenyl acrylamide (DOPAM), N-(p-tetradecyl)phenyl acrylamide (TEPAM), N-(p-hexadecyl)phenyl acrylamide (HEPAM), N-(p-dodecyl)naphthyl acrylamide (DONAM), N-(p-tetradecyl)naphthyl acrylamide (TENAM), N-(p-hexadecyl)naphthyl acrylamide (HENAM), N-(p-dodecyl)azobenzenyl acrylamide (DOAZAM), N-(-p-tetradecyl)azobenzenyl acrylamide (TEAZAM), N-(p-hexadecyl)azobenzenyl acrylamide (HEAZAM), or N-[4-(3-(5-(4-dodecyl-phenylcarbamoyl)pentyl-carbamoyl)-propyl] phenyl acrylamide (DOPPPAM). Of course, the monomer may be a mixture of at least two of those listed monomers.

The monomer may be a monoclinic crystal structure, preferably in the form of monoclinic single crystal, which can be supported by the three-dimensional structure of FIG. 1. As the monomer is obtained in the form of monoclinic single crystal and then subjected to RAFT polymerization to prepare a polymer, the individual monomer molecules in the polymer chain are more regularly arranged and better oriented to combine together and thereby more preferably form the polymer having mesoporosity and crystallinity according to one embodiment of the invention.

To obtain the monomer in the form of single crystal, as demonstrated in the following examples, a crystal growth agent is added in a polar solvent and/or a nonpolar solvent after the synthesis of the monomer, to grow single crystals. The growth rate of the single crystal depends on the crystal growth time and temperature, or the chemical structure and concentration of the added crystal growth agent (e.g., seed crystal).

The radical initiator, the RAFT agent, and the monomer are dissolved in an organic solvent to prepare a reaction solution, and RAFT polymerization takes place in the reaction solution. The organic solvent as used herein includes at least one non-polar solvent selected from the group consisting of n-hexane, cyclohexane, benzene, toluene, chlorobenzene, dichlorobenzene, methylene chloride, or 1,2-dichloroethane; or at least one polar solvent selected from the group consisting of acetone, chloroform, tetrahydrofuran (THF), dioxane, monoglyme, diglyme, dimethylformamide (DMF), dimethylsulfoxide (DMSO), or dimethylacetamide (DMAC). The organic solvent may also be a mixture of the non-polar and polar solvents. The organic solvent can also be used in the re-precipitation step to dissolve the polymer product.

In the reaction solution, the monomer is dissolved in the organic solvent at a concentration of about 3.0 to 50 wt %, preferably about 5.0 to 40 wt % with respect to the weight of the organic solvent. The reaction solution in this concentration range makes the subsequent polymerization process work out in an efficient way.

The radical initiator used along with the monomer may be any known initiator for radical polymerization without limitation, including any one selected from the group consisting of azobisisobutyronitrile (AIBN), 2,2'-azobis-2,4-dimethylvaleronitrile, benzoyl peroxide (BPO), and di-t-butyl peroxide (DTBP); or at least two selected from the group of radical initiators.

The RAFT agent as used herein includes any thermal decomposition initiator such as S-1-dodecyl-S'-(α,α'-dimethyl-α"-acetic acid)trithiocarbonate, cyanoisopropyl dithiobenzoate, cumyldithiobenzoate, cumylphenylthioacetate, 1-phenylethyl-1-phenyldithioacetate, or 4-cyano-4-(thiobenzoylthio)-N-succinimide valerate. The RAFT agent may also be a mixture of at least two of the above-listed initiators.

The radical initiator and the RAFT agent are used at a concentration of about 0.001 to 5.0 wt % with respect to the weight of the monomer.

In the above-described preparation method, the RAFT polymerization step is carried out at a reaction temperature of about 60 to 140° C., for about 30 to 200 hours, more specifically, about 50 to 170 hours.

In the precipitation or re-precipitation step of the preparation method, the nonsolvent is a solvent that does not dissolve the product of the polymerization process or the acrylamide-based mesoporous polymer. The examples of the nonsolvent may include a polar solvent such as methanol, ethanol, n-propanol, isopropanol, or ethyleneglycol; or a non-polar solvent such as n-hexane, cyclohexane, or n-heptane. Of course, the nonsolvent may also be a mixture of at least two of the above-listed solvents. The precipitation and re-precipitation processes using the nonsolvent facilitate the production of the polymer having mesoporosity and crystallinity with a high purity.

Advantageous Effects

As described above, the present invention provides an acrylamide-base mesoporous polymer and its preparation method in which the acrylamide-based mesoporous polymer can be prepared easily by a polymerization process alone without any separate chemical treatment to have a large number of pores with a uniform pore size. In particular, the acrylamide-based mesoporous polymer can be controlled in pore diameter in a relatively easy way.

Accordingly, the present invention provides a means for easily producing the mesoporous polymer applicable to many uses in various fields on a large scale for industrial and practical uses. The mesoporous polymer thus obtained can be preferably used in many applications that need mesoporous materials for use of adsorbing or capturing various catalysts, volatile organic compounds, gaseous molecules or proteins.

DESCRIPTION OF DRAWINGS

FIG. 4 shows a change in the DSC thermal analysis curve when the polymer of Example 4 is subjected to an annealing.

FIG. 5 is the SAXS patterns of polymers prepared in Examples 4, 9 and 10.

MODE FOR INVENTION

Figure 1:
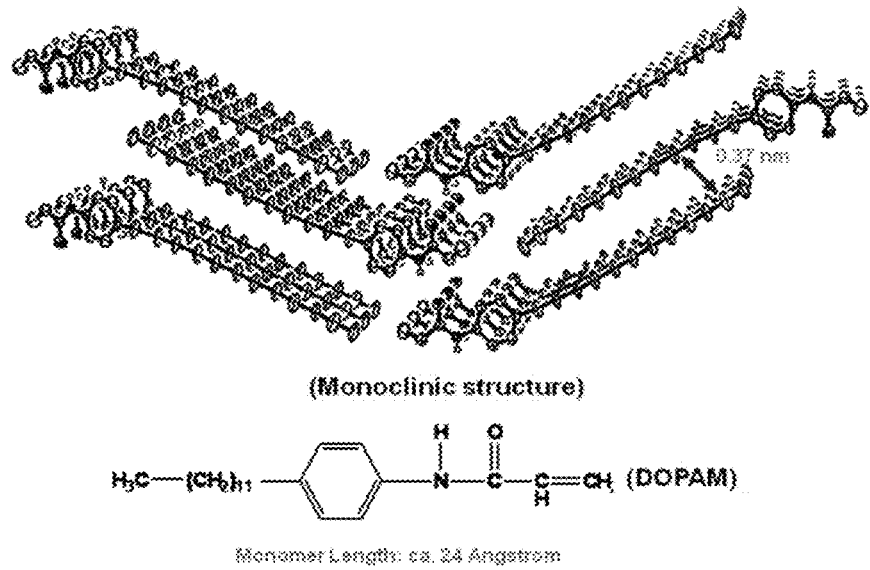
FIG. 1 shows an example of the three-dimensional structure that supports the monoclinic single crystal structure of an acrylamide-based monomer used in the preparation of a polymer according to one embodiment of the invention.

In the following are set forth specific examples according to the invention, describing the function and effect of the invention in further detail. It is to be understood that the examples are only for illustrative purposes and are not intended to limit the scope of the invention.

Examples 1, 2 and 3

Synthesis of Acrylamide-Based Monomer and Determination of Crystallinity

Example 1

Synthesis of p-Dodecylphenylacrylamide (DOPAM) and Preparation of Single Crystal Firstly, p-dodecylaniline (12 g, 0.046 mol) was dissolved in THF solvent (100 mL). The solution was poured into a 100 mL three-mouthed round flask, and an acid eliminator was added dropwise through a funnel for 10 minutes, where the acid eliminator contained imidazole and triethyl amine at the same mole fraction (0.023 mol). Under the nitrogen atmosphere, a solution containing acryloyl chloride (3.8 mL, 0.047 mol) in THF (20 mL) was gradually added dropwise to the mixed solution through a dropping funnel for 20 minutes. Meanwhile, the solution was cooled on ice bath to prevent the temperature of the reaction mixture from rising above 5° C. After 6 hours of reaction at 0° C., the solution was kept at 25° C. for more 9 hours of reaction. Upon completion of the reaction, the solution was passed through a filter paper to eliminate precipitated salts, and the solvent was evaporated from the filtrate on an evaporator. The solid thus obtained was dissolved in dichloromethane (100 mL) and added to a separatory funnel along with 10% aqueous $NaHCO_3$ solution (50 mL). The funnel was shaken vigorously and set aside to allow for the complete separation of the aqueous phase and thereby to remove unreacted acryloyl chloride. Magnesium sulfate (1.0 g) was added to the separated dichloromethane solution. After stirred for 5 hours, the solution was subjected to filtration to remove a trace amount of water dissolved in the solvent. The dichloromethane solution thus obtained was kept on the evaporator, and n-hexane (100 mL) was added. The solution was stirred for 2 hours, and unreacted p-dodecyl aniline was filtered out from the solution. The filtrate was then removed of the solvent on the evaporator to yield a white solid DOPAM product (yield 95%). The chemical structure of the DOPAM product was identified by hydrogen nuclear magnetic resonance ($^1$H-NMR) spectrum. The results were as follows.

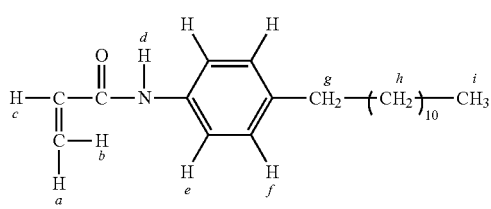

¹H-NMR (CDCl₃): e, 할 7.5 (d, 2H); d, 할 7.2 (s, 1H); f, 할 7.15 (d, 2H); b, 할 6.4 (d, 1H); c, 할 6.2 (q, 1H); b, 할 5.8 (d, 1H); g, 할 2.6 (t, 2H); h, 할 1.25-1.35 (m, 20H); i, 할 0.935 (t, 3H).

The DOPAM product ($T_m$=101° C.) was purified by re-crystallization with ethanol three times. The purified DOPAM was added to THF solvent, an several drops of a non-polar solvent was added. The solution was kept below −10° C. for a defined period of time to grow single crystals of the monomer.

It turned out that the growth rate of the single crystals was dependent on the composition and proportion of polar and non-polar solvents, crystal growth time and temperature, and the structure and concentration of the crystal growth agent added.

XRD (X-Ray Diffractometry) was used to identify the crystal structure of the single crystals obtained in Example 1. The crystallographic data thus obtained is presented in Table 1, which shows that the single crystals of the monomer of Example 1 have a monoclinic crystal structure.

TABLE 1

| Crystallographic Data for Single Crystals of Monomer of Example 1 | |
| --- | --- |
| Empirical Formula | $C_{21}H_{33}N_1O_1$ |
| Formula weight | 315.48 |
| Temperature [K] | 293(2) K |
| Wavelength [Å] | 0.71073 |
| Crystal system, space group | Monoclinic, $P2_1/c$ |
| a [Å] | 4.7055(13) |
| b [Å] | 43.315(16) |
| c [Å] | 9.4150(19) |
| β [°] | 95.158(19) |
| Volume [Å³] | 1911.2(10) |
| $d_{calcd}$ [gcm⁻³] | 1.096 |
| μ [mm⁻¹] | 0.066 |
| F(000) | 696 |
| Crystal size [mm] | 0.55 × 0.30 × 0.25 |
| θ Range [°] | 1.88-26.33 |
| Data/parameters | 1845/213 |
| GOF on F² | 1.111 |
| R1, wR2 [I > 2σ(I)] | 0.0975, 0.2551 |
| Largest diff. peak and hole [e · Å⁻³] | 0.358 and −0.343 |

Example 2

Synthesis of p-Tetradecylphenylacrylamide (TEPAM) and p-Hexadecylphenylacrylamide (HEPAM) and Preparation of Single Crystal TEPAM and HEPAM were synthesized with the yields of 90% and 93%, respectively in the same manner as described in Example 1, excepting that p-tetradecylaniline having 14 carbon atoms or p-hexadecylaniline having 16 carbon atoms was used instead of p-dodecylaniline having 12 carbon atoms. The single crystals of TEPAM and HEPAM were grown and identified through XRD analysis technique in the same manner as described in Example 1, revealing that the single crystals had a monoclinic crystal structure.

Example 3

Synthesis of N-[4-(3-(5-(4-dodecyl-phenylcarbamoyl)pentyl-carbamoyl)-propyl)phenyl acrylamide (DOPPPAM) and Preparation of Single Crystal 4-(4-aminophenyl)butyric acid (6 g, 3.36 mmol) was added to a 200 mL three-mouthed round flask, and methylene chloride (100 mL) was added and dissolved under the nitrogen atmosphere at 40° C. To the solution was added chlorotrimethyl silane (6.0 mL). The solution was refluxed and agitated for 2 hours and, after reaction, cooled down to the room temperature. While kept at 0 to 5° C. on an ice bath under the nitrogen atmosphere, an acid eliminator (in an excess amount by 10% in concentration relative to the reactant) was added dropwise through a funnel for 10 minutes, where the acid eliminator contained imidazole and tetraethyl amine mixed at the same mole fraction. In the same manner, a solution containing acryloyl chloride (2.8 mL) in methylene chloride (30 mL) was added dropwise for 20 minutes, and the solution was kept for 30 minutes of reaction and then warmed up to the room temperature for 2 more hours of reaction. After the solvent was removed, 2M sodium hydroxide solution (200 mL) was added, and the solution was stirred for 2 hours. The aqueous solution was weak-acidified (pH 5~6) with a 2M hydrogen chloride solution to form an aqueous solution containing a white precipitate. This solution was added to a separatory funnel along with ethylacetate (200 mL) and shaken up to cause phase separation into aqueous and ethylacetate layers. The solvent in the ethylacetate layer where the product is dissolved was removed on an evaporator, and the residual solid was dried out in a vacuum oven for 24 hours to yield a white 4-(4-acrylaminophenyl)butyric acid (APB) solid (yield 92%). The melting point of the solid was 107° C.

Subsequently, N-(t-butylester)caproic acid (6.0 g, 25.1 mmol) and 4-dodecylamine (5.1 g) were added to a 500 mL three-mouthed round flask, and THF (300 mL) was added and dissolved at 0-5° C. on an ice bath under the nitrogen atmosphere. DMAP (1.59 g, 12.9 mmol) was added as a catalyst, and the solution was stirred for 10 minutes. EDC (5.98 g, 31.2 mmol) was added as a moisture remover, and the solution was stirred for one hour and then 18 more hours at the room temperature. After the reaction, the solution was precipitated in distilled water (1200 mL) and stirred for one hour. The residual substances, such as DMAP, EDC, EDC urea salt and THF were filtered out, and a reactant-product mixture was then extracted. An aqueous NaHCO₃ solution (200 mL) was added three times to the extracted mixture, and the solution was stirred for one hour and removed of unreacted N-(t-butylester)caproic acid through filtration. To the solid obtained was added n-hexane (600 mL), and the solution was stirred for one hour and removed of unreacted 4-dodecylaniline through filtration. The residual solid was dried out in a vacuum oven for 24 hours to yield a white 5-(4-dodecylphenyl-carbamoyl)pentyl)-carbamic acid t-butyl ester solid (yield 91%).

The solid product, 5-(4-dodecylphenyl-carbamoyl)pentyl)-carbamic acid t-butyl ester (6.0 g, 12.6 mmol) was added to a one-mouthed round flask, and methylene chloride (150 mL) was added and dissolved at the room temperature. Trifluoroacetic acid (18.9 mL, 2.52 mol) was added, and the solution was stirred for 2 hours and removed of the solvent. Ethylether (90 mL) was added, and the solution was stirred for 30 minutes and then removed of unreacted 5-(4-dodecylphenyl-carbamoyl)pentyl)-carbamic acid t-butyl ester through filtration. The residual solid was dried out in a vacuum oven for 24 hours to yield a white 5-(4-dodecylphenyl-carbamoyl)pentyl)-amine solid (yield 97%).

The above 5-(4-dodecylphenyl-carbamoyl)pentyl)-amine solid (3.0 g, 7.9 mmol) and the APB solid (1.86 g) previously obtained were added to a 500 mL three-mouthed round flask, and THF (150 mL) was added and dissolved at 0-5° C. on an ice bath under the nitrogen atmosphere. DMAP (1.95 g, 10.1 mmol) was added as a catalyst, and the solution was stirred for 10 minutes. EDC (1.831 g, 9.6 mmol) was added as a moisture remover, and the solution was stirred for one hour and then 18 more hours at the room temperature. After the reaction, the solution was precipitated in distilled water (600 mL) and stirred for one hour. The residual substances, such as DMAP, EDC, EDC urea salt and THF were filtered out, and a reactant-product mixture was then extracted. An aqueous NaHCO$_3$ solution (600 mL) was added to the extracted mixture, and the solution was stirred for one hour and removed of unreacted ABP through filtration. To the solid thus obtained was added ethanol (300 mL), and the solution was stirred for one hour and removed of unreacted 5-(4-dodecylphenyl-carbamoyl)pentyl)-amine through filtration. The residual solid was dried out in a vacuum oven for 24 hours to yield a white DOPPPAM solid (yield 89%, melting point 174° C.).

The DOPPPAM thus obtained was dissolved in THF solvent, and several drops of a non-polar solvent were added. To the solution was added a trace of a crystal growth agent to cause crystal growth at a low temperature below −10° C. for a defined period of time, thereby producing pure needle-like DOPPPAM crystals. The chemical structure of the pure DOPPPAM was identified by hydrogen nuclear magnetic resonance ($^1$H-NMR) spectrum. The results were as follows.

Examples 4-12

Preparation of Novel Acrylamide-Based Mesoporous Polymer

Example 4

Preparation of Poly(DOPAM)-1

The DOPAM monomer (1.0 g) obtained in the rod-like crystal form in Example 1 was dissolved in THF (6.3 mL) and poured in a 20 mL ampoule along with S-1-dodecyl-S'-(α,α'-dimethyl-α"-acetic acid)trithiocarbonate (20 mg) as a RAFT agent and AIBN (0.44 mg) as a radical initiator. The solution was removed of oxygen by freeze-thaw method, and the ampoule was sealed and kept at 60° C. in an oven to cause RAFT polymerization for 168 hours. After the polymerization reaction, the reaction solution was precipitated with methanol (200 mL) and then subjected to filtration to give a light yellowish solid. The solid thus obtained was dried out in a vacuum oven for 24 hours to yield a pure homopolymer, Poly[DOPAM]-1. The polymerization conversion and the number-average molecular weight were 50% and 9500, respectively. The homopolymer had a very narrow molecular weight distribution of 1.21 and a melting point ($T_m$) of 241° C.

Example 5

Preparation of Poly(DOPAM)-2

The DOPAM monomer (1.0 g) obtained the rod-like crystal form in Example 1 was dissolved in THF (6.3 mL) and

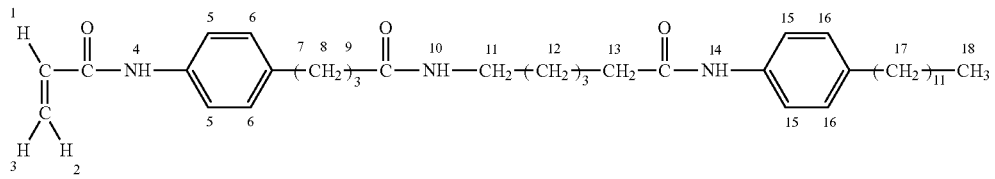

$^1$H-NMR (DMSO-d6): 4, 할 10.06 (s, 1H); 14, 할 9.76 (s, 1H); 10, 할 7.78 (m, 1H); 5, 할 7.59 (m, 2H); 6, 할 7.23 (m, 2H); 15, 할 7.12 (d, 2H); 16, 할 7.08 (d, 2H); 1, 할 6.42 (q, 1H); 2, 할 6.24 (d, 1H); 3, 할 5.72 (d, 1H); 11, 할 3.01 (m, 2H); 7, 할 2.26 (m, 2H); 9, 할 2.06 (m, 2H); 8, 할 1.78 (m, 2H); 13, 할 1.55 (m, 2H); 17, 할 1.52 (m, 2H); 12, 할 1.40 (m, 6H); 17, 할 1.23 (m, 20H); 18, 할 0.85 (t, 3H)

Figure 2:
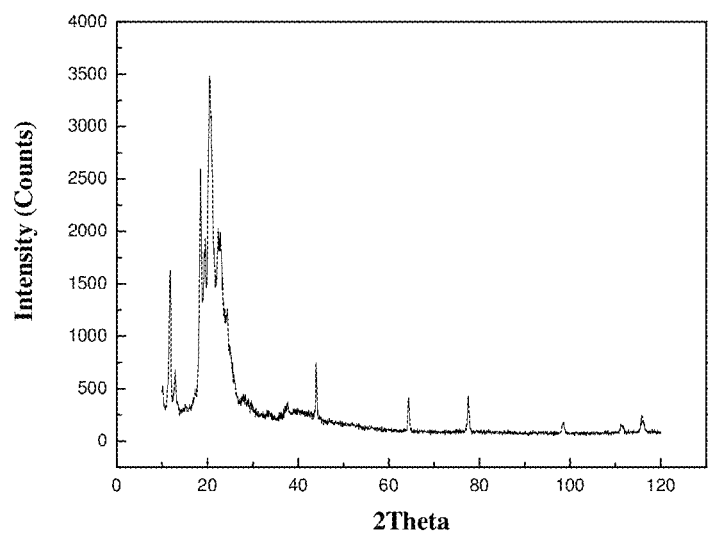
FIG. 2 shows the X-ray diffraction pattern of a DOPPPAM crystal obtained in Example 3.

The XRD instrument was used to determine the crystallinity of the needle-like DOPPPAM crystals obtained in Example 3. The X-ray diffraction pattern of the crystals is shown in FIG. 2, which demonstrates that the DOPPPAM also had crystallinity. According to the X-ray diffraction pattern, the monomer of Example 3 also turned out to have a crystal structure in which the individual molecules were very well-arranged spatially in the solid state.

poured in a 10 mL Schenk flask along with cyanoisopropyl dithiobenzoate (1.75 mg) as a RAFT agent and AIBN (0.87 mg) as a radical initiator. The solution was stirred under the nitrogen atmosphere for 30 minutes, removed of oxygen and kept in a silicon oil container at 70° C. to cause RAFT polymerization for 72 hours. After the polymerization reaction, the reaction solution was precipitated with methanol (200 mL) and then subjected to filtration to give an orange solid. The solid was dissolved in THF (8 mL) and re-precipitated with an excess of methanol. The light yellowish solid thus obtained was dried out in a vacuum oven for 24 hours to yield a pure homopolymer, Poly[DOPAM]-2. The polymerization conversion and the number-average molecular weight were 48% and 14900, respectively. The homopolymer had a very narrow molecular weight distribution of 1.25 and a melting point ($T_m$) of 242° C.

Example 6

Preparation of Poly(DOPAM)-3

The procedures were performed to obtain a pure Poly [DOPAM]-3 polymer in the same manner as described in Example 5, excepting that there were used the DOPAM monomer (1.5 g) obtained in the rod-like crystal form in Example 1, benzene (7.8 mL), cyanoisopropyl dithiobenzoate (2.63 mg) as a RAFT agent and AIBN (1.3 mg) as a radical initiator. The polymerization conversion and the number-average molecular weight were 66% and 35000, respectively. The polymer had a very narrow molecular weight distribution of 1.39 and a melting point ($T_m$) of 242° C.

Example 7

Preparation of Poly(DOPAM)-4

The DOPAM monomer (1.0 g) obtained in the rod-like crystal form in Example 1 was added in a 20 mL ampoule along with THF (6.24 mL) and AIBN (5.2 mg) used as a radical initiator. The solution was removed of oxygen by freeze-thaw method, and the ampoule was sealed and kept at 60° C. in an oven to cause radical polymerization for 96 hours. After the polymerization reaction, the reaction solution was precipitated with methanol (200 mL) and then subjected to filtration to give a light yellowish solid. The solid was dissolved in THF (6 mL) and re-precipitated with an excess of methanol. The solid thus obtained was dried out in a vacuum oven more than overnight to yield a light yellowish pure homopolymer, Poly[DOPAM]-4. The polymerization conversion and the number-average molecular weight were 90% and 12000, respectively. The homopolymer had a molecular weight distribution of 2.1 and a melting point ($T_m$) of 241° C.

Example 8

Preparation of Poly(DOPAM)-5

The procedures were performed to obtain a pure Poly[DOPAM]-5 polymer in the same manner as described in Example 7, excepting that there were used the DOPAM monomer (1.0 g) obtained in the rod-like crystal form in Example 1, THF/benzene mixture (6.5 mL (50/50 v/v), BPO (10 mg) as a radical initiator. The polymerization conversion and the number-average molecular weight were 72% and 49000, respectively. The polymer had a molecular weight distribution of 3.4 and a melting point ($T_m$) of 242° C.

Example 9

Preparation of Poly(TEPAM)

The procedures were performed to obtain a pure Poly[TEPAM] polymer in the same manner as described in Example 4, excepting that there was used the TEPAM monomer (1.0 g) obtained in the rod-like crystal form in Example 2. The polymerization conversion and the number-average molecular weight were 55% and 9900, respectively. The Poly[TEPAM] homopolymer had a very narrow molecular weight distribution of 1.30 and a melting point ($T_m$) of 237° C.

Example 10

Preparation of Poly(HEPAM)

The procedures were performed to obtain Poly[HEPAM] in the same manner as described in Example 4, excepting that there was used the HEPAM monomer (1.0 g) obtained in the rod-like crystal form in Example 2. The polymerization conversion and the number-average molecular weight were 46% and 7500, respectively. The Poly[HEPAM] homopolymer had a very narrow molecular weight distribution of 1.27 and a melting point ($T_m$) of 229° C.

Example 11

Preparation of Poly(DOPPPAM)-1

The procedures were performed to obtain a light yellowish homopolymer, Poly[DOPPPAM] in the same manner as described in Example 4, excepting that there were used the DOPPPAM monomer (1.0 g) obtained in the needle-like crystal form in Example 3, DMF (7.06 mL), AIBN (1.4 mg) as a radical initiator, and S-1-dodecyl-S'-(α,α'-dimethyl-α"-acetic acid)trithiocarbonate (6.2 mg) as a RAFT agent, and that polymerization was carried out at 60° C. (polymerization temperature) for 132 hours (polymerization time). The polymerization conversion and the number-average molecular weight were 20% and 11000, respectively. The Poly[DOPPPAM] homopolymer had a very narrow molecular weight distribution of 1.29 and a melting point ($T_m$) of 252° C.

Example 12

Preparation of Poly(DOPPPAM)-2

The procedures were performed to obtain a light yellowish homopolymer, Poly[DOPPPAM] in the same manner as described in Example 4, excepting that there were used the DOPPPAM monomer (1.0 g) obtained in the needle-like crystal form in Example 3, DMF (4.22 mL), and DTBP (0.004 mg) as a radical initiator, and that polymerization was carried out at 110° C. (polymerization temperature) for 48 hours (polymerization time). The polymerization conversion and the number-average molecular weight were 61% and 19200, respectively. The Poly[DOPPPAM] polymer had a very narrow molecular weight distribution of 1.65 and a melting point ($T_m$) of 254° C.

Experimental Example

Analysis on Thermal Properties and Solid Structure of Novel Acrylamide-Based Mesoporous Polymer (1) Analysis on Thermal Properties of Polymer by DSC A DSC thermoanalytical instrument was used to examine the phase transition behavior of the Poly(DOPAM), Poly(TEPAM) and Poly(HEPAM) polymers prepared in Examples 4, 9 and 10, respectively. Through the DSC thermoanalysis, the three polymers turned out to be crystalline polymers with melting temperatures ($T_m$) of 241, 237 and 229° C., respectively. The melting temperature ($T_m$) of the polymers had a tendency to lower gradually with an increase in the number of carbon atoms of the aliphatic hydrocarbon introduced at the end in order of 12, 14 and 16. The Poly(DOPPPAM) polymers of Examples 11 and 12 of a different chemical structure also turned out to be a crystalline polymer having a melting temperature ($T_m$) of 256° C.

Figure 3:
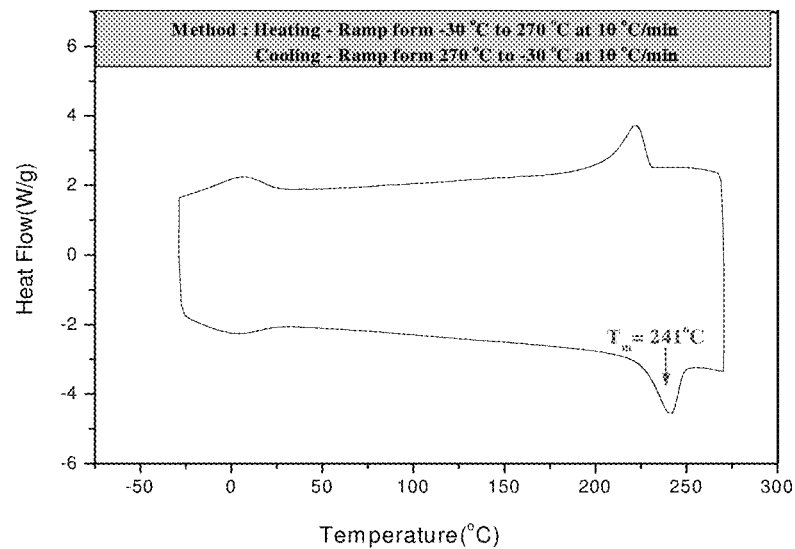
FIG. 3 shows the DSC thermal analysis curve of a polymer prepared in Example 4.

FIG. 3 is a DSC thermal analysis curve showing the behavior of the phase transition temperature of Poly(DOPAM)-1 obtained in Example 4. Referring to FIG. 3, the melting temperature ($T_m$) of the mesoporous structure formed by the polymer chain of the Poly(DOPAM) polymer was 241° C. The melting temperatures ($T_m$) of the minute crystals formed from the aliphatic hydrocarbon introduced at the end of the repeating unit were about 5° C. As the phase transition melting temperatures appeared in the almost same temperature range on both heating and cooling curves with the same heat capacity, the porous structure formed among the polymer chains of the Poly(DOPAM) polymer was presumably oriented in a relatively stable way. There was no significant difference in the melting temperature ($T_m$) when the Poly (DOPAM) polymer had a number-average molecular weight greater than 8000.

The crystalline polymer Poly(DOPAM)-1 obtained in Example 4 was subjected to annealing heat treatment at 220° C., 225° C., and 230° C. each for one hour. It is notable that the only endothermic peak at 241° C. (melting temperature $T_m$) on the DSC curve of the polymer split into two peaks after the annealing heat treatment; for example, at 225° C. ($T_{m1}$) and 243° C. ($T_{m2}$) when the annealing temperature was 220° C.

Figure 4A:
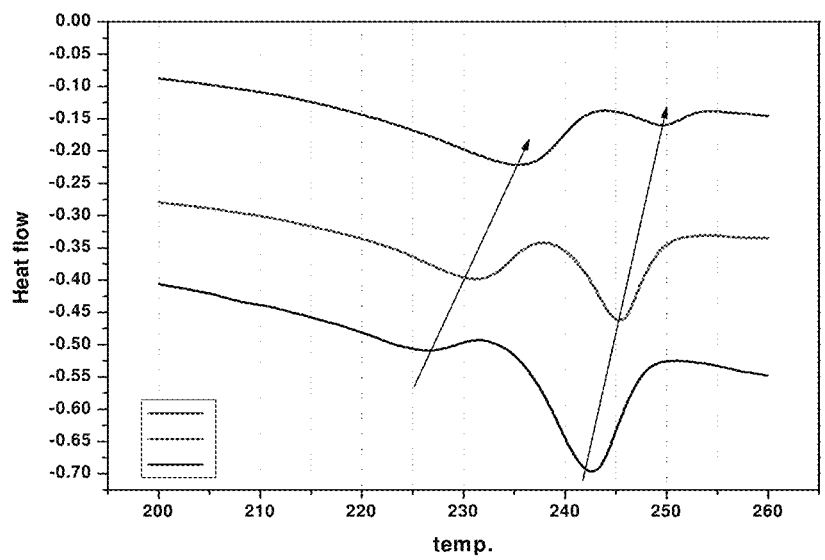
FIG. 4a is the DSC thermal analysis curve with a gradual increase of the annealing temperature.
Figure 4B:
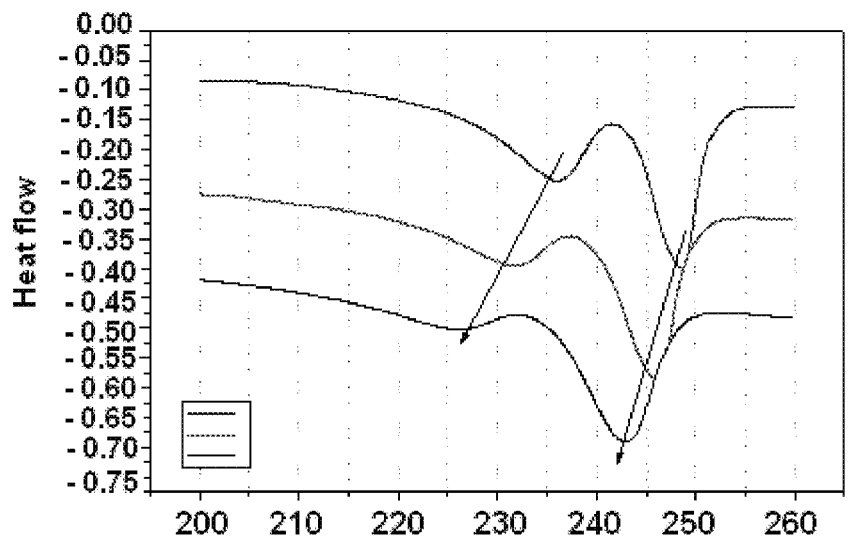
FIG. 4b is the DSC thermal analysis curve with a gradual decrease in the annealing temperature.

Referring to FIG. 4a, with a rise in the annealing temperature (in increasing order of 220° C.<225° C.<230° C.), the heat capacity in the endothermic peak at $T_{m1}$ gradually increased; but the capacity in the endothermic peak at $T_{m2}$ gradually decreased. Referring to FIG. 4b, as the annealing temperature lowered (in decreasing order of 230° C.>225° C.>220° C.), the result was the opposite of what happened with the rise of the annealing temperature. This demonstrates that as the melting temperature of the polymer Poly(DOPAM) rose from 225° C. ($T_{m1}$) to 243° C. ($T_{m2}$), the unknown mesoporous crystal structure in the polymer chain changed into a different mesoporous crystal structure.

(2) Analysis on Solid Structure of Polymer by XRD

An SAXS instrument in the Pohang Accelerator Laboratory was used to identify the solid powder structures of the polymers Poly(DOPAM), Poly(TEPAM) and Poly(HEPAM) respectively prepared in Examples 4, 9 and 10, as the temperature was elevated from room temperature to melting temperature at a constant rate. The measurement results are presented in FIGS. 5a, 5b and 5c.

Figure 5A:
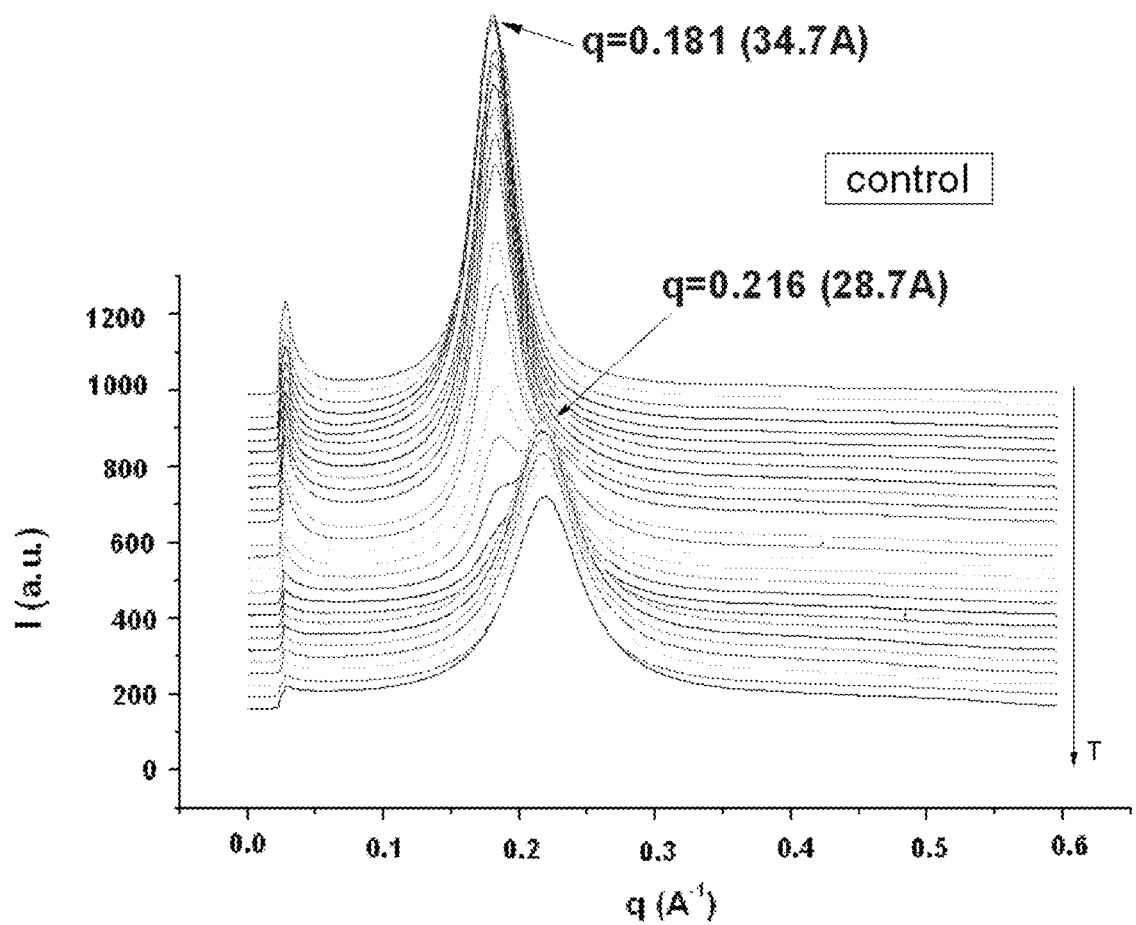
FIGS. 5a, 5b and 5c show the SAXS patterns of the polymers prepared in Examples 4, 9 and 10, respectively.
Figure 5B:
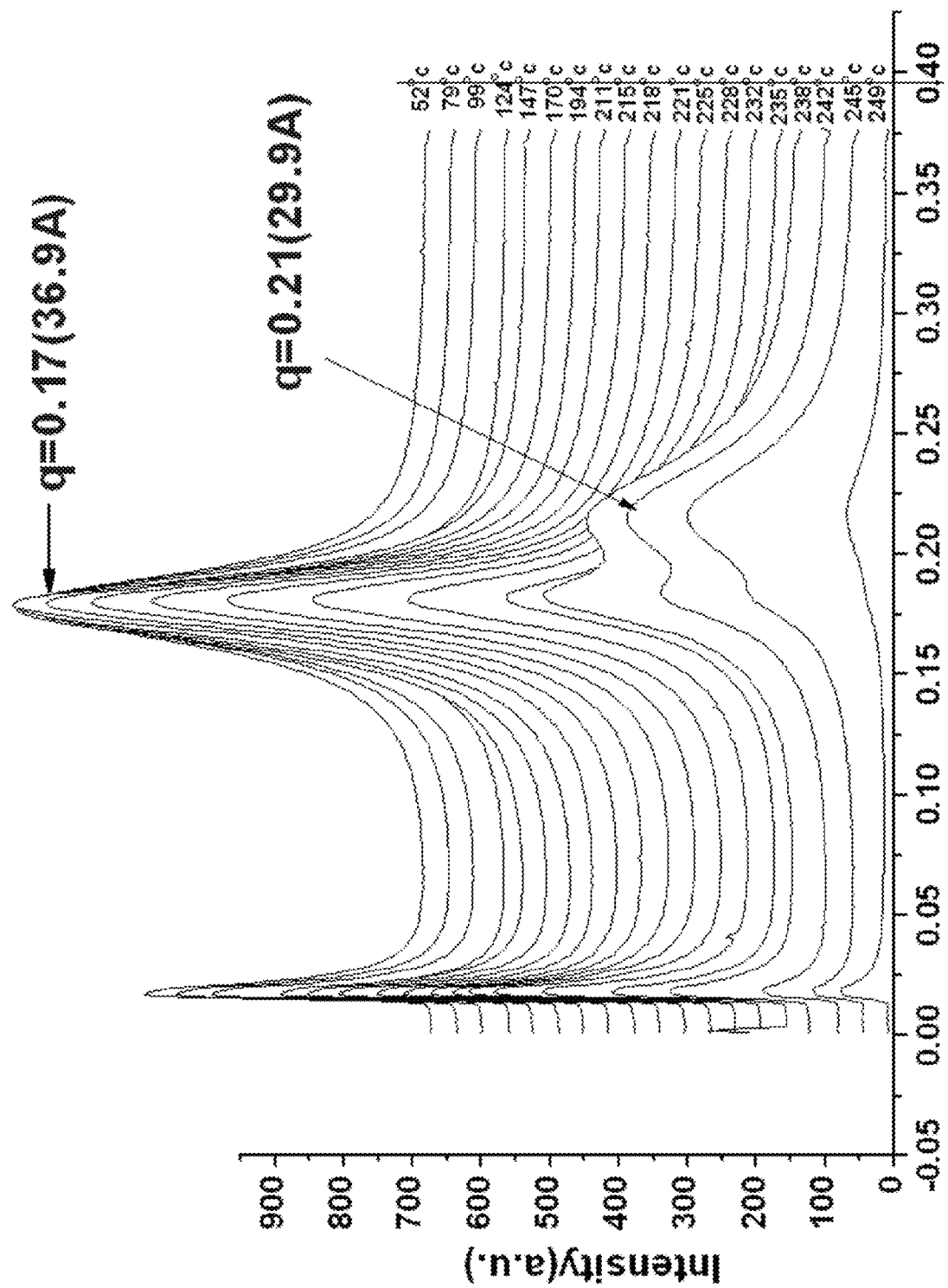
Figure 5C:
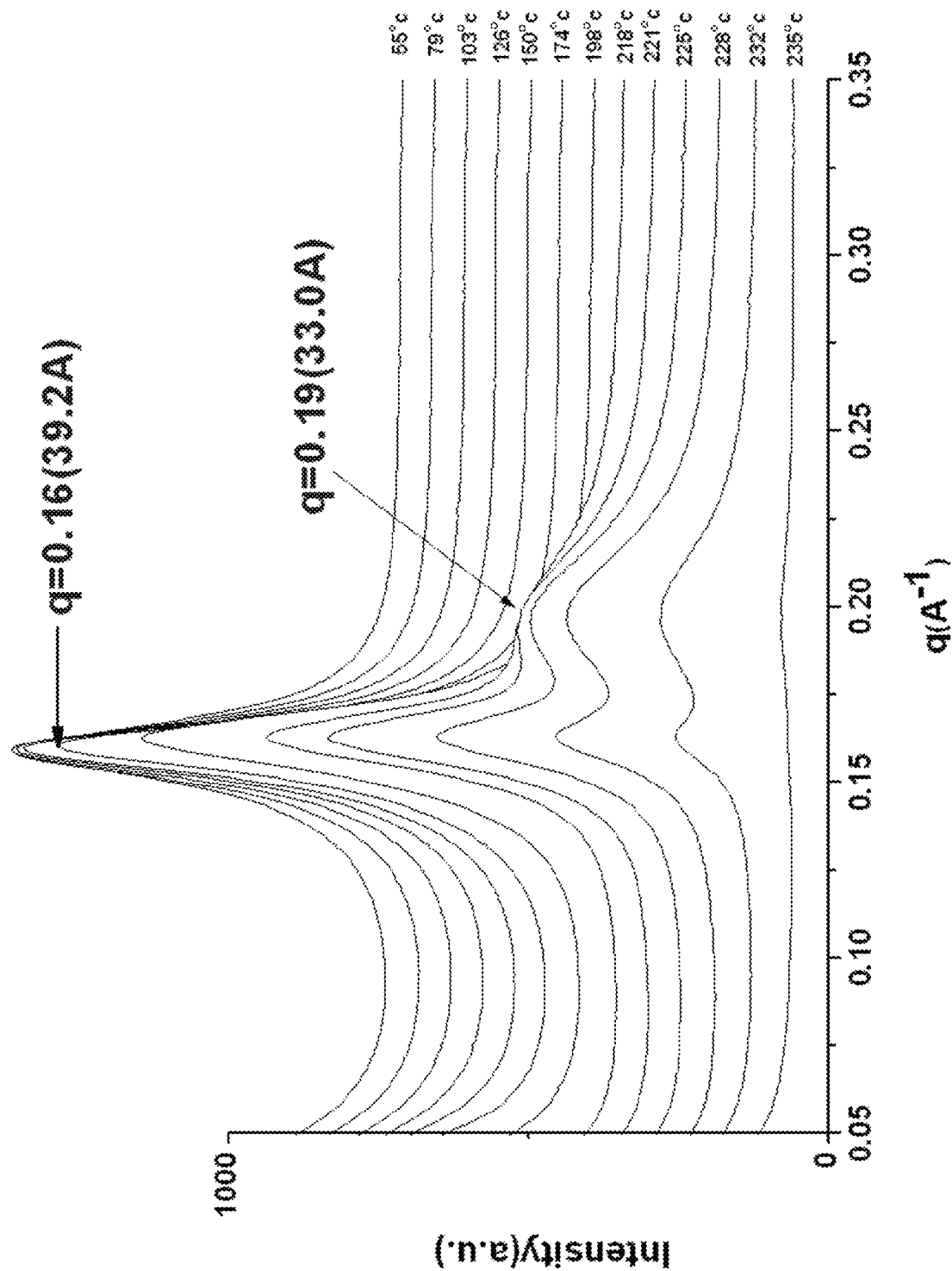

The results showed that the crystalline polymers Poly (DOPAM), Poly(TEPAM) and Poly(HEPAM) having a narrow molecular weight distribution as prepared in Examples 4, 9 and 10 had a typical tubular structure characterized by that only a single strong peak appeared at a small angle (refer to FIGS. 5a, 5b and 5c).

As for Poly(DOPAM) of Example 4, q value changed completely from 0.181 to 0.219 with rising annealing temperature to above 220° C., and ended up to 0.219 when the annealing temperature approached closely to the melting temperature of 240° C. This means that the diameter of the cylindrical structure of the crystalline Poly(DOPAM) polymer decreased by 0.6 nm from 3.47 nm to 2.87 nm (refer to FIG. 5a). Likewise, the same situation was shown in the polymers of Examples 9 and 10. In other words, in the same manner of Poly(DOPAM) of Example 4, Poly(TEPAM) and Poly(HEPA) of Example 9 and 10 had the diameter of the cylindrical structure reduced to 2.99 nm and 3.30 nm, respectively, by about 0.6 nm as the annealing temperature rose to above 220° C. (see FIGS. 5b and 5c).

On the other hand, there was a tendency that with an increase in the number of carbon atoms of the aliphatic hydrocarbon introduced to the polymer (e.g., in increasing order of 12<14<16 for the polymers of Examples 4, 9 and 10, respectively), the diameter of the cylindrical structure of the polymer was increased (e.g., by an increase of about 0.22 nm in order of 3.47 nm<3.69 nm<3.92 nm).

The above-described features disclosed that the acrylamide-based mesoporous polymers of the Examples can be controlled in pore size by regulating the number of carbon atoms of the hydrocarbon or annealing conditions. Moreover, those analysis results consist with the DSC thermal analysis curves that showed the melting temperatures and a change in heat capacity of the crystalline polymer Poly(DOPAM) of Example 4 annealed under different temperature conditions above 220° C. (see FIGS. 4a and 4b). In conclusion, a change in the porous crystal structure present in the polymer chain predictably presumably entailed a change in the pore size.

(3) Analysis on Porous Structure of Polymer by TEM

Figure 6:
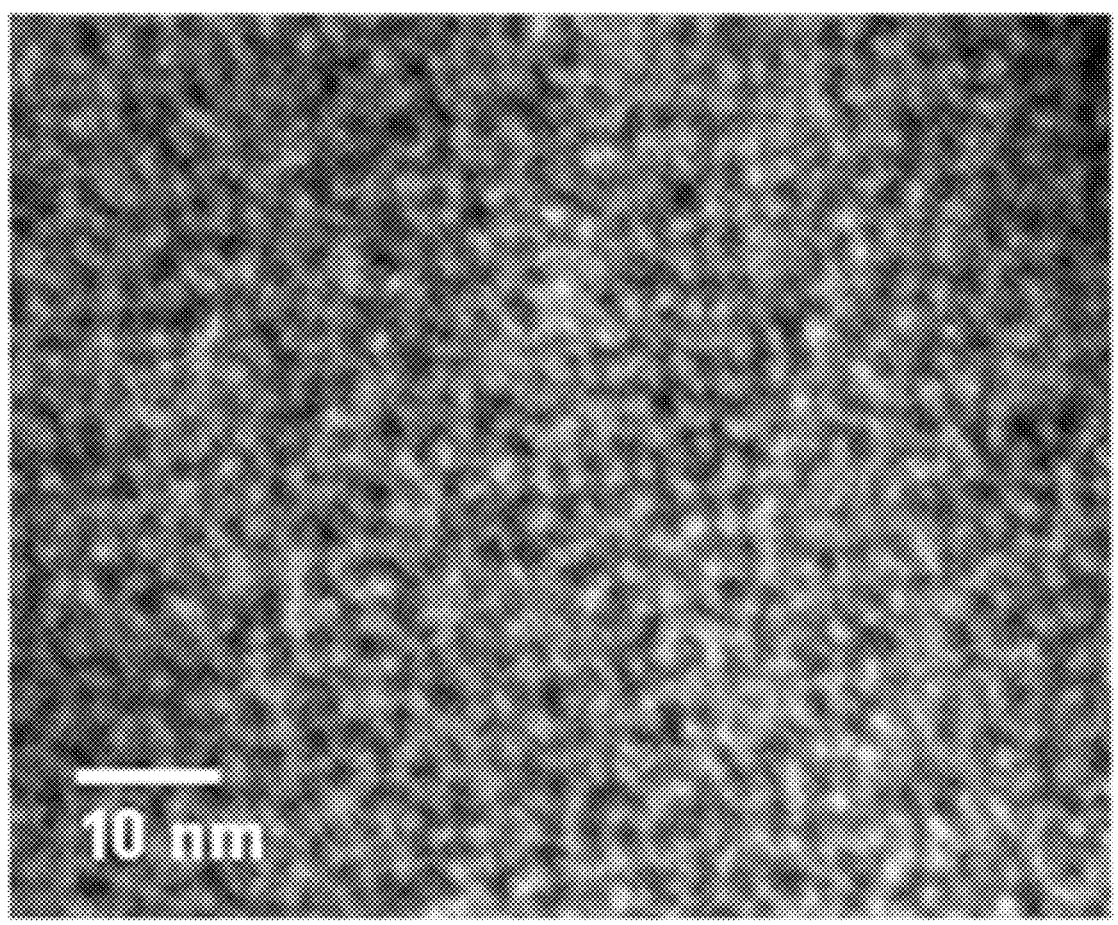
FIG. 6 shows the TEM picture of a thin film including the polymer of Example 4.

A thin film including the polymer Poly(DOPAM)-1 of Example 4 was made and taken to get the TEM (Transmission Electron Microscopy) image as shown in FIG. 6. The thin film was prepared in the manner that the solid powder of Poly (DOPAM)-1 was annealed at the melting temperature for 6 hours and quenched in liquid nitrogen. FIG. 6 is the TEM image of the thin film that was cut up in thickness about 50 to 120 nm and subjected to deposition of $RuO_4$ vapor. Referring to FIG. 6, the dark part shows the $RuO_4$ vapor deposited on the benzene group introduced in the polymer chain of Poly (DOPAM)-1 forming the frame of the cylindrical structure. It can be seen from FIG. 6 that the bright image structure with a pore size of about 3.5 nm is relatively uniformly distributed over the surface of the thin film. In conclusion, the polymers of the Examples contained a large number of mesopores with a uniform pore size.

The invention claimed is:

1. An acrylamide-based mesoporous polymer comprising at least one repeating unit of formula 1, and including a plurality of pores having a diameter of 2.0 to 10.0 nm in solid state,

[Formula 1]

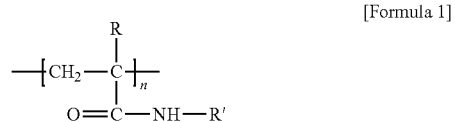

wherein n is an integer from 15 to 1800; R is hydrogen or methyl; and R' is X,

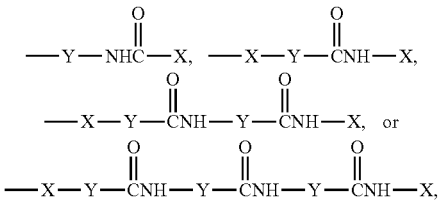

wherein X is —Z—R"; Y is alkylene having 1 to 10 carbon atoms; Z is arylene having 6 to 20 carbon atoms; and R" is a linear or branched hydrocarbon having 10 to 20 carbon atoms, or a linear or branched perfluorohydrocarbon having 10 to 20 carbon atoms.

2. The acrylamide-based mesoporous polymer as claimed in claim 1, wherein Z is arylene selected from the group consisting of:

o-phenylene

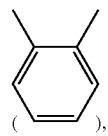

m-phenylene

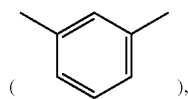, p-phenylene

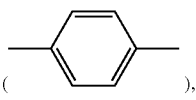, naphthalene

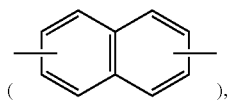, azobenzene

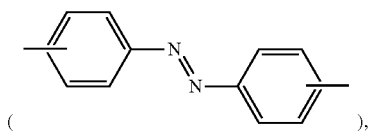, anthracene

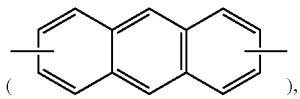, phenanthrene

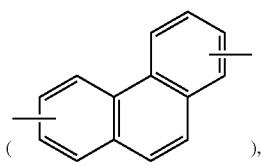, tetracene

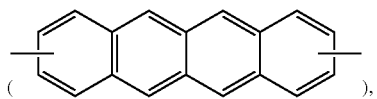, pyrene

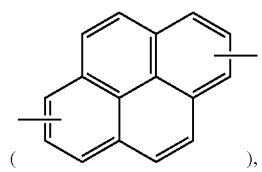, and benzopyrene

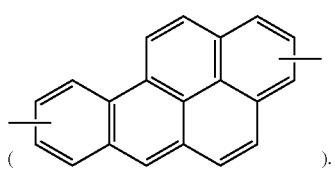.

3. The acrylamide-based mesoporous polymer as claimed in claim 1, wherein R" is a substituent at ortho-, meta- or para-position of an aromatic ring included in Z.

4. The acrylamide-based mesoporous polymer as claimed in claim 1, wherein the acrylamide-based mesoporous polymer has a number-average molecular weight of 5000 to 500000.

5. The acrylamide-based mesoporous polymer as claimed in claim 1, wherein the acrylamide-based mesoporous polymer is a crystalline polymer having a melting point ($T_m$) of 200 to 300° C.

6. The acrylamide-based mesoporous polymer as claimed in claim 1, wherein the pore diameter decreases by 0.4 to 0.7 nm after an annealing at a temperature of 200° C. or more and below the melting point of the acrylamide-based mesoporous polymer.

7. The acrylamide-based mesoporous polymer as claimed in claim 1, wherein the acrylamide-based mesoporous polymer includes pores having a diameter increasing by 0.1 to 2.0 nm with a change in the chemical structure of R' or with an increase in the number of carbon atoms of R".

* * * * *